United States Patent
Sugiyama et al.

(10) Patent No.: US 9,098,082 B2
(45) Date of Patent: Aug. 4, 2015

(54) DEVICE AND METHOD FOR SUPPLYING GAS WHILE DIVIDING TO CHAMBER FROM GAS SUPPLYING FACILITY EQUIPPED WITH FLOW CONTROLLER

(71) Applicants: Fujikin Incorporated, Osaka (JP); Tokyo Electron Ltd., Tokyo (JP)

(72) Inventors: Kazuhiko Sugiyama, Yamanishi (JP); Nobukazu Ikeda, Osaka (JP); Kouji Nishino, Osaka (JP); Ryousuke Dohi, Osaka (JP); Toyomi Uenoyama, Osaka (JP)

(73) Assignees: FUJIKIN INCORPORATED, Osaka (JP); Tokyo Electron Ltd., Tokyo (JP)

( * ) Notice: Subject to any disclaimer, the term of this patent is extended or adjusted under 35 U.S.C. 154(b) by 211 days.

(21) Appl. No.: 13/927,786

(22) Filed: Jun. 26, 2013

(65) Prior Publication Data

US 2013/0340837 A1    Dec. 26, 2013

Related U.S. Application Data

(62) Division of application No. 10/561,514, filed as application No. PCT/JP2004/008117 on Jun. 10, 2004, now Pat. No. 8,496,022.

(30) Foreign Application Priority Data

Jun. 20, 2003  (JP) .................................. 2003-177134

(51) Int. Cl.
G05D 11/02 (2006.01)
G05D 7/00 (2006.01)
(Continued)

(52) U.S. Cl.
CPC ................ *G05D 7/00* (2013.01); *G05D 7/0623* (2013.01); *G05D 7/0652* (2013.01); *G05D 7/0658* (2013.01); *G05D 7/0664* (2013.01); *G05D 11/132* (2013.01)

(58) Field of Classification Search
CPC . G05D 7/0652; G05D 7/0658; G05D 7/0623; G05D 7/0664; G05D 11/132
USPC .............................................. 137/100, 101.19
See application file for complete search history.

(56) References Cited

U.S. PATENT DOCUMENTS 2,961,829 A    11/1960    Weisenbach
4,980,204 A    12/1990    Fujii et al.
(Continued)

FOREIGN PATENT DOCUMENTS

JP    8-338546  A2    12/1996
JP    11-63265  A     3/1999
(Continued)

OTHER PUBLICATIONS

International Search Report issued in corresponding application PCT/JP2004/008117, completed Sep. 6, 2004 and mailed Sep. 21, 2004.

(Continued)

*Primary Examiner* — Kevin Murphy
(74) *Attorney, Agent, or Firm* — Griffin & Szipl, P.C.

(57) ABSTRACT

The invention supplies a quantity Q of gas while dividing at flow rate ratio Q1/Q2 from a gas supply facility equipped with a flow controller. A total quantity Q=Q1+Q2 of gas is supplied into a chamber at flow rate Q1 and Q2 through shower plates fixed to ends of branch supply lines by providing open/close valves with a plurality of branch supply lines GL1 and GL2, respectively, to supply the specified quantity of gas from the gas supply facility, and by utilizing bypass line BL1 on the downstream side of the open/close valve OV1 and branched from GL1, bypass line BL2 on the downstream side of the open/close valve OV2 and branched from GL2, pressure type division quantity controller connected to the bypass line BL1 and the bypass line BL2, a sensor measuring pressure inside branch supply line GL1, and another sensor measuring pressure inside branch supply line GL2.

7 Claims, 6 Drawing Sheets

(51) Int. Cl.
*G05D 7/06* (2006.01)
*G05D 11/13* (2006.01)

(56) References Cited

U.S. PATENT DOCUMENTS

| | | | |
|---|---|---|---|
| 5,157,957 | A | 10/1992 | Mettes et al. |
| 5,390,693 | A | 2/1995 | Thomsen |
| 5,453,124 | A | 9/1995 | Moslehi et al. |
| 5,669,408 | A | 9/1997 | Nishino et al. |
| 5,850,853 | A | 12/1998 | Ohmi et al. |
| 5,865,205 | A | 2/1999 | Wilmer |
| 5,951,772 | A | 9/1999 | Matsuse et al. |
| 6,418,954 | B1 | 7/2002 | Taylor et al. |
| 6,473,993 | B1 | 11/2002 | Yagi et al. |
| 7,059,363 | B2 | 6/2006 | Sugiyama et al. |
| 2002/0038669 | A1 | 4/2002 | Yamagishi et al. |
| 2002/0170598 | A1 | 11/2002 | Girard et al. |
| 2005/0005994 | A1 | 1/2005 | Sugiyama et al. |

FOREIGN PATENT DOCUMENTS

| | | |
|---|---|---|
| JP | 11-265218 A | 9/1999 |
| JP | 2002-161086 A2 | 6/2002 |
| JP | 2003-323218 A | 11/2003 |
| JP | 2004-5308 A | 1/2004 |

OTHER PUBLICATIONS

McGraw-Hill Dictionary of Scientific and Technical Terms 429 and 805 (1978).

DEVICE AND METHOD FOR SUPPLYING GAS WHILE DIVIDING TO CHAMBER FROM GAS SUPPLYING FACILITY EQUIPPED WITH FLOW CONTROLLER

This is a Divisional Application of U.S. Ser. No. 10/561,514, filed Dec. 20, 2005, which is a National Phase Application in the United States of International Patent Application No. PCT/JP2004/008117 filed Jun. 10, 2004, which claims priority on Japanese Patent Application No. 2003-177134, filed Jun. 20, 2003. The entire disclosures of the above patent applications are hereby incorporated by reference.

FIELD OF THE INVENTION

The present invention is to be used for semiconductor manufacturing facilities, and is concerned with improvements in supplying gas while automatically dividing to a chamber from a gas supplying facility equipped with a flow controller.

BACKGROUND OF THE INVENTION

A device called a pressure type flow controller has been widely used for flow control of gas to be supplied to a chamber of a semiconductor manufacturing facility.

FIG. 5 illustrates an example in the event that processing gas G is supplied into a chamber to form a silicon oxide film using a pressure type flow controller FCS. A specified quantity Q of processing gas G is supplied to a pressure-reduced chamber C by using a vacuum pump Vp, and a quantity Q of processing gas G is discharged to a wafer H on the supporting device I through a gas discharger D.

On the other hand, the afore-mentioned pressure type flow controller FCS utilizes the relation that "when a critical condition $P_1 > $ approx. $2 \times P_2$ is maintained, a quantity Q of gas passing through an orifice L is determined only by gas pressure $P_1$ on the upstream side of the orifice, and is represented by the formula $Q = CP_1$ (where C is a constant dependent on the bore of the orifice L and gas temperature)", thus a quantity Q on the downstream side of the orifice L being able to be held at a desired set value by regulating the afore-mentioned pressure $P_1$ with a control valve CV.

With FIG. 5, $P_0$ designates supply pressure of processing gas G, Pm a manometer, F a filter, CPU a central processing unit, Qs an input signal for a flow rate setting, and Qe an output signal for control of the flow rate.

A pressure type flow controller itself has been publicly disclosed with the TOKU-KAI-HEI No. 8-338546, the TOKU-KAI-HEI No. 11-63265 and others. Therefore, detailed explanations are omitted herewith.

With the afore-mentioned flow controller FSC, it becomes an essential condition that, as stated above, gas pressure $P_1$ on the upstream side of the orifice and gas pressure $P_2$ on the downstream side of the orifice are within the afore-mentioned critical condition. The drawback is that the flow control cannot be performed because the critical expansion pressure condition is not satisfied, for example, when gas pressure $P_2$ on the downstream side of the orifice rises more than gas pressure $P_1$ on the upstream side of the orifice.

Another drawback is that flow control accuracy is lowered in reality when $P_1/P_2$ reaches closer the limit value of the afore-mentioned critical pressure condition with the rise of pressure $P_2$ on the downstream side of the orifice. Thus limiting the flow control range capable of being used when pressure $P_2$ on the downstream side rises.

As above, various drawbacks are seen with the control of the gas flow rate by the pressure type flow controller when pressure $P_2$ on the downstream side of the orifice L rises. However, the gas supply method to a chamber by using the said pressure type flow controller FCS allows the gas flow control with the high degree of accuracy easily to be performed, and makes it possible that a pressure regulating device with the high degree of accuracy at the gas supply source is not required to be provided, thus allowing considerable reductions of the costs in a gas supply facility, to achieve excellent, practical effects.

On the other hand, a silicon wafer with a larger external diameter has been used for semiconductor manufacturing in recent years. In the case of the wafer H with an external diameter of 300 mm φ, for example, there are required separate adjustments for supply quantities of processing gas to the center part and the peripheral (edge) part respectively.

As a measure to handle the matter, processing gas can be supplied to the afore-mentioned center part and edge part respectively by providing separate branch supply lines $GL_1$ and $GL_2$ as shown in FIG. 6, thus being able to supply processing gas G without any difficulties from a gas supply source S with specified quantities $Q_1$ and $Q_2$ even with gas supply lines $GL_1$ and $GL_2$ wherewith a pressure type flow controller FCS.

However, to supply gas using gas supply lines $GL_1$ and $GL_2$ both of which are equipped with a pressure type flow controller $FCS_1$ and $FCS_2$ independently into a chamber invites a rise in installation costs as well as upsizing of a semiconductor manufacturing facility, and is also found to be time-consuming for its maintenance. For these reasons, the method is undesirable.

To solve these problem, as shown in FIG. 7, it is found desirable that the method wherewith flow rate $Q_1$ and $Q_2$ of branch gas supply lines $GL_1$ and $GL_2$ are controlled by branching two gas supply lines $GL_1$ and $GL_2$ from a pressure type flow controller FCS and regulating, and regulating flow rate control valves $V_1$ and $V_2$ equipped with the gas supply lines $GL_1$ and $GL_2$ respectively is employed.

Among the general-purpose pressure type flow controllers FCS for a gas supply facility presently used, ones with flow rate control characteristics capable of being used within the range of 0~100 Torr of pressure $P_2$ on the downstream side of the orifice under optimum conditions have been widely employed in general. Accordingly, with these pressure type flow controllers FCS, the flow rate control range is considerably limited when pressure $P_2$ on the downstream side of the orifice exceeds approximately 100 Torr, as described above, from the point of flow rate accuracy.

For example, let's assume that processing gas G of a flow rate Q=300 SCCM is to be supplied to a chamber C through supply lines $GL_1$ and $GL_2$ at flow rates of $Q_1$=130 SCCM and $Q_2$=170 SCCM in FIG. 7. With a gas supply facility not equipped with a pressure type flow controller FCS, firstly flow rate control valves $V_1$ and $V_2$ are closed, and next, the flow rate of processing gas is set to Q=300 SCCM, and then flow rates $Q_1$ and $Q_2$ can be adjusted to the set value by regulating the degree of opening of control valves $V_1$ and $V_2$ automatically or with reference of a flow meter (not illustrated).

However, in the event that a pressure type flow controller FCS is used for a flow controller of the gas supply facility as illustrated in FIG. 7, both control valves $V_1$ and $V_2$ are first placed in a state of being fully closed, and a flow rate Q (300 SCCM) of the pressure type flow controller FCS is set. Then, the degree of opening of both control valves $V_1$ and $V_2$ are adjusted to the flow rate $Q_1$ (130 SCCM) and $Q_2$ (170 SCCM)

for branch supply lines $GL_1$ and $GL_2$. This, however, finds it difficult to control the flow rates accurately and quickly.

The reasons are that there is a possibility that the values of $P_1/P_2$ are out of the threshold value of critical pressure conditions of the afore-mentioned pressure type flow controller FCS due to the rise of pressure $P_2$ on the upstream side of both control valves $V_1$ and $V_2$ when opening of $V_1$ and $V_2$ are small, thus resulting in that the control flow rate Q with the pressure type flow controller FCS becomes vastly different from the set flow rate of Q=300 SCCM.

To solve the afore-mentioned difficulties, inventors of the present invention have applied for a patent, the TOKU-GAN-HEI No. 2002-161086 by developing a method to supply gas while dividing gas into a chamber from a gas supply facility.

This is a completely new idea of switching from the conventional and well-worn method wherewith gas from a gas supply facility is supplied while dividing for being controlled, that is, flow rate control valves $V_1$ and $V_2$ provided with branch supply lines are put in a state of fully or near-fully closing, and then, both flow rate control valves $V_1$ and $V_2$ are gradually opened, while with the new method both flow rate control valves $V_1$ and $V_2$ are made to be in a state of fully or near-fully opening, and then, both flow rate control valves $V_1$ and $V_2$ are regulated to the direction of closing step by step for the opening adjustment, thus making it possible that while a total flow quantity Q is controlled at the high degree of accuracy with the pressure type flow controller FCS, flow rates $Q_1$ and $Q_2$ are controlled by the pressure type division quantity controllers $FV_1$ and $FV_2$ provided with branch supply lines $GL_1$ and $GL_2$ at a desired flow rate ratio $Q_1/Q_2$ accurately and quickly.

With the method, there will be no possibility that pressure $P_2$ on the downstream side of the orifice of the pressure type flow controller FCS rises sharply at the time of being divided even with processing gas from a gas supply facility provided with a pressure type flow controller FCS, thus making it possible that the total quantity Q is accurately controlled at a desired flow rate value Q regardless of the flow control while dividing by means of a pressure type division quantity controllers $FV_1$ and $FV_2$. Accordingly, excellent characteristics of a pressure type flow controller FCS can be utilized, thus making it possible that the flow division control while dividing is performed accurately and quickly, and also with a plurality of flow rate ratios $Q_2/Q_1$.

As stated above, the method employed in the TOKU-GAN-HEI No. 2002-161086 made it possible that flow rates $Q_1$ and $Q_2$ of branch supply lines $GL_1$ and $GL_2$ are regulated at a desired flow rate ratio $Q_1/Q_2$ accurately and quickly. However, on the other hand, the method made the control complicated because it employed two pressure type division quantity controllers $FV_1$ and $FV_2$ beside a pressure type flow controller FCS for regulating pressure on both sides, thus inviting another problem of facility costs becoming higher.

Patent Literature 1: TOKU-KAI-HEI No. 8-338546 Public Bulletin

Patent Literature 2: TOKU-KAI-HEI No. 11-632656 Public Bulletin

DISCLOSURE OF THE INVENTION

Object of the Invention

It is an object of the present invention to solve a problem that, with a conventional method wherewith gas is supplied while dividing to a chamber from a gas supply facility as illustrated in FIG. 7, flow rate control accuracy is lowered when critical pressure conditions are out of a threshold values due to that pressure $P_2$ on the upstream side of control valves $V_1$ and $V_2$ rises in the event that the degree of opening of control valves $V_1$ and $V_2$ are small.

It is also another object of the present invention to solve a problem that, with techniques newly developed with the TOKU-GAN-HEI No. 2002-161086, two pressure type division quantity controllers $FV_1$ and $FV_2$ are required beside a pressure type flow controller FCS, thus inviting high facility costs and making flow control complicated.

Means to Achieve the Objects

To solve the afore-mentioned problems, inventors of the present invention have developed a device and a method, simply structured and manufactured at low costs, for supplying gas while dividing to a chamber from a gas supply facility accurately and quickly.

The present invention in accordance with a first apparatus embodiment is fundamentally so constituted that, with a device for supplying a specified quantity Q of gas G while dividing at a specified flow rate ratio $Q_1/Q_2$ from a gas supply facility 1 provided with a flow controller QCS into a chamber C through a plurality of branch supply lines $GL_1$ and $GL_2$ and shower plates 3 and 4 fixed to the ends thereof, open/close valves $OV_1$ and $OV_2$ are provided with an afore-mentioned plurality of branch supply lines $GL_1$ and $GL_2$ respectively, and also a bypass line $BL_1$ on the downstream side of an open/close valve $OV_1$ and branched from the branch supply line $GL_1$, a bypass line $BL_2$ on the downstream side of an open/close valve $OV_2$ and branched from the branch supply line $GL_2$, a pressure type division quantity controller FV connected to the afore-mentioned bypass lines $BL_1$ and $BL_2$, a pressure sensor $PS_1$ to measure pressure inside the branch supply line $GL_1$, and a pressure sensor $PS_2$ to measure pressure inside the branch supply line $GL_2$ are provided.

The present invention, in accordance with a second apparatus embodiment, further modifies the first apparatus embodiment and is fundamentally so constituted that a control device CT to regulate the degree of opening of a pressure type division quantity controller FV is provided to reduce the difference between actual pressure of the branch supply line and set pressure to reach the specified flow rate ratio $Q_1/Q_2$ by comparing either one of set pressure $PI_1$ or $PI_2$ of the branch supply lines $GL_1$ and $GL_2$ to reach the specified flow rate ratio $Q_1/Q_2$ with corresponding actual pressure $PT_1$ or $PT_2$ of the branch supply lines $GL_1$ or $GL_2$ measured by the pressure sensor $PS_1$ or the pressure sensor $PS_2$.

The present invention, in accordance with a third apparatus embodiment, further modifies the first apparatus embodiment and the second apparatus embodiment and is fundamentally so constituted that an open/close valve $OV_1$ and an open/close valve $OV_2$ are pneumatically operated, and a switch valve SV is provided for supplying actuating air to the open/close valve $OV_1$ and the open/close valve $OV_2$.

The present invention, in accordance with a fourth apparatus embodiment, further modifies the first apparatus embodiment, the second apparatus embodiment and the third apparatus embodiment and is fundamentally so constituted that an open/close valve $OV_1$ and an open/close valve $OV_2$ are made to be integrated.

The present invention, in accordance with a fifth apparatus embodiment, further modifies the first apparatus embodiment, the second apparatus embodiment, the third apparatus embodiment and the fourth apparatus embodiment and is fundamentally so constituted that a pressure type flow controller FCS is used for a flow controller QCS.

The present invention, in accordance with a first method embodiment, is fundamentally so constituted that, with a method for supplying a specified quantity Q of gas G while dividing at a specified flow rate ratio $Q_1/Q_2$ from a gas supply facility 1 provided with a flow controller QCS into a chamber C through a plurality of branch supply lines $GL_1$ and $GL_2$ and shower plates 3 and 4 fixed to the ends thereof, open/close valves $OV_1$ and $OV_2$ are installed on an afore-mentioned plurality of branch supply lines $GL_1$ and $GL_2$ respectively, and also a bypass line $BL_1$ on the downstream side of an open/close valve $OV_1$ and branched from the branch supply line $GL_1$, a bypass line $BL_2$ on the downstream side of an open/close valve $OV_2$ and branched from the branch supply line $GL_2$, a pressure type division quantity controller FV connected to the afore-mentioned bypass lines $BL_1$ and $BL_2$, and further a pressure sensor $PS_1$ to measure pressure inside the branch supply line $GL_1$, and a pressure sensor $PS_2$ to measure pressure inside the branch supply line $GL_2$ are provided so that a total quantity $Q=Q_1+Q_2$ of gas is supplied while dividing into a chamber C at desired division quantities $Q_1$ and $Q_2$ by opening the open/close valve of the branch supply line which has a larger flow rate to regulate the degree of opening of the afore-mentioned pressure type division quantity controller FV, and adjusting the flow rate of the branch supply line which has the larger flow rate to the branch supply line which has the smaller flow rate, thus regulating pressure in the branch supply line $GL_1$ and the branch supply line $GL_2$.

The present invention, in accordance with a second method embodiment, further modifies the first method embodiment and is so practiced that the degree of opening of a pressure type division quantity controller FV is regulated to reduce the difference between actual pressure of a branch supply line and set pressure to reach a specified flow rate ratio $Q_1/Q_2$ by comparing either one of set pressure $PI_1$ or $PI_2$ of branch supply lines $GL_1$ and $GL_2$ to reach the specified flow rate ratio $Q_1/Q_2$ with corresponding actual pressure $PT_1$ or $PT_2$ of the branch supply lines $GL_1$ and $GL_2$ measured by the pressure sensor $PS_1$ or the pressure sensor $PS_2$.

The present invention, in accordance with a third apparatus embodiment, further modifies the first method embodiment and the second method embodiment and is so practiced that an open/close valve $OV_1$ and an open/close valve $OV_2$ are pneumatically operated, and a switch valve SV is provided for supplying actuating air to the open/close valve $OV_1$ and the open/close valve $OV_2$ so that the open/close valve of the branch supply line with the larger supply quantity is made open by the switch valve SV.

The present invention, in accordance with a fourth method embodiment, further modifies the first method embodiment, the second method embodiment and the third method embodiment and is so practiced that a pressure type flow controller is used for a flow controller QCS.

EFFECTS OF THE INVENTION

The present invention provides a device for supplying gas while dividing to a chamber from a gas supply facility equipped with a flow controller which is so constituted that, with a device for supplying a specified quantity Q of processing gas while dividing at a specified flow rate ratio $Q_2/Q_1$ from a gas supply facility 1 equipped with a flow controller QCS into a chamber C through a plurality of branch supply lines $GL_1$ and $GL_2$ and shower plates 3 and 4 fixed to the ends thereof, a division quantity controller 2 comprising an open/close valves $OV_1$ and $OV_2$ installed on an afore-mentioned plurality of branch supply lines $GL_1$ and $GL_2$ respectively, a bypass line $BL_1$ branched from a branch supply line $GL_1$ on the downstream side of the open/close valve $OV_1$, a bypass line $BL_2$ branched from a branch supply line $GL_2$ on the downstream side of the open/close valve $OV_2$, a pressure type division quantity controller FV connected to the bypass line $BL_1$ and the bypass line $BL_2$, a pressure sensor $PS_1$ to measure pressure inside the branch supply line $GL_1$, and a pressure sensor $PS_2$ to measure pressure inside the branch supply line $GL_2$ is installed between the afore-mentioned gas supply facility 1 and a chamber C so that a specified quantity Q of gas is supplied while dividing into the chamber at a specified flow rate ratio $Q_1/Q_2$ through shower plates 3 and 4 fixed to the ends of branch supply lines $GL_1$ and $GL_2$.

As a result, pressure control on a number of flow rate ratios $Q_2/Q_1$ becomes possible accurately and quickly with the pressure type division quantity controller, thus achieving an excellent effect of making facility costs lowered.

The present invention provides a method for supplying gas while dividing to a chamber from a gas supply facility equipped with a flow controller characterized by that, with a method for supplying a specified quantity Q of processing gas while dividing at a specified flow rate ratio $Q_1/Q_2$ from a gas supply facility 1 equipped with a flow controller QCS into a chamber through a plurality of branch supply lines $GL_1$ and $GL_2$ and shower plates 3 and 4 fixed to the ends thereof, a division quantity controller 2 comprising an open/close valves $OV_1$ and $OV_2$ installed on an afore-mentioned plurality of branch supply lines $GL_1$ and $GL_2$ respectively, a bypass line $BL_1$ branched from a branch supply line $GL_1$ on the downstream side of the open/close valve $OV_1$, bypass line $BL_2$ branched from a branch supply line $GL_2$, a pressure type division quantity controller FV connected to the bypass line $BL_1$ and the bypass line $BL_2$, a pressure sensor $PS_1$ to measure pressure inside the branch supply line $GL_1$, and a pressure sensor $PS_2$ to measure pressure inside the branch supply line $GL_2$ is installed between the afore-mentioned gas supply facility 1 and a chamber C, and also that a total quantity $Q=Q_1+Q_2$ of gas while dividing is supplied into the afore-mentioned chamber C at desired flow rates $Q_1$ and $Q_2$ by regulating pressure of the branch supply line $GL_1$ and the branch supply line $GL_2$ by opening the open/close valve of a branch supply line having a larger flow, to adjust the degree of opening of the afore-mentioned pressure type division quantity controller FV, thus adjusting a flow rate of gas running from a branch supply line having a larger flow rate of supply to a branch supply line having a smaller flow rate of supply, to regulate pressure of the branch supply line $GL_1$ and the branch supply line $GL_2$.

As a result, pressure control on a number of flow rate ratios $Q_2/Q_1$ can be performed accurately and quickly with one set of pressure type division quantity controller, thus achieving excellent effects of making facility costs lowered and pressure control easier.

Figure 1:
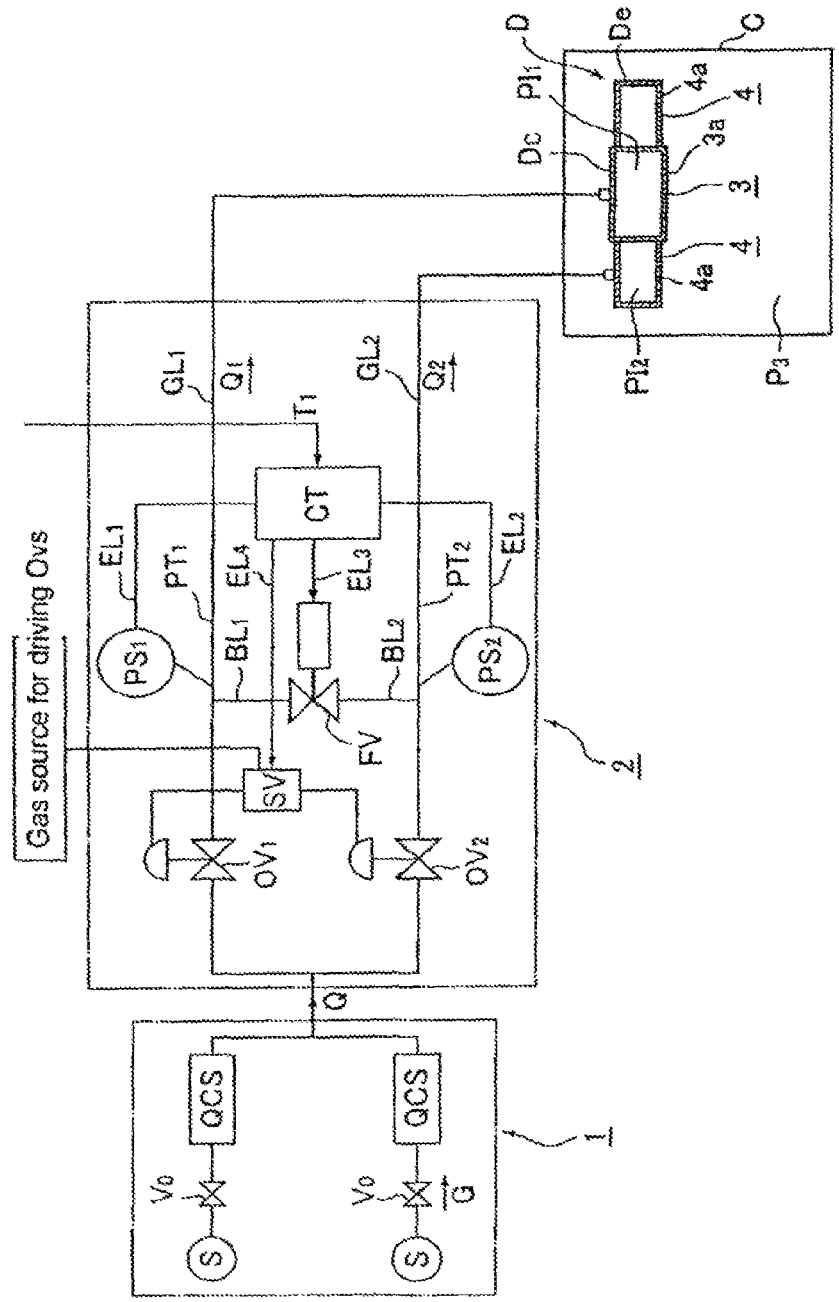
FIG. 1 is an overall schematic diagram to explain a device and a method for supplying gas while dividing to a chamber from a gas supply facility equipped with a flow controller according to the present invention.

LIST OF REFERENCE CHARACTERS AND NUMERALS $BL_1 \cdot BL_2$ Bypass lines
C Chamber
D Gas discharger
Dc Gas discharger for the center part
De Gas discharger for the edge part
FV Pressure type division quantity controller
$GL_1$ Branch supply line for the center part
$GL_2$ Branch supply line for the edge part
$OV_1 \cdot OV_2$ Open/close valves
$PT_1 \cdot PT_2$ Pressure in branch supply lines
P Pressure inside a chamber
$PS_1 \cdot PS_2$ Pressure sensors of branch supply lines
QCS Flow controller
SV Electric switch valve
1 Gas supply facility
2 Division quantity controller
3 Shower plate of a gas discharger for the center part
3a Orifice hole made in a shower plate
4 Shower plate of a gas discharger for the edge part
4a Orifice hole made in a shower plate

BEST MODE TO CARRY OUT THE INVENTION

The embodiment in accordance with the present invention is described hereunder with reference to the drawings.

FIG. 1 is an overall schematic diagram to explain a device and a method for supplying gas while dividing to a chamber from a gas supply facility equipped with a flow controller QCS according to the present invention. In FIG. 1, a gas supply facility 1 comprises a supply source S of processing gas G, a gas main valve VO, a flow controller QCS and the like. A division quantity controller 2 comprises a pressure type division quantity controller FV, a communication control circuit CT and the like.

Further, in FIG. 1, C designates a chamber, D a gas discharger, Dc a gas discharger for the center part, De a gas discharger for the edge part, $GL_1$ a branch supply line for the center part, $GL_2$ a branch supply line for the edge part, Q a total quantity of gas, $Q_1 \cdot Q_2$ flow rates while dividing, $PT_1 \cdot PT_2$ pressure in branch supply lines $GL_1$ and $GL_2$, $P_3$ pressure inside a chamber C, $PS_1 \cdot PS_2$ pressure sensors of branch supply lines $GL_1$ and $GL_2$, 3 a shower plate of a gas discharger Dc for the center part, 3a an orifice hole made on the shower plate, 4 shower plate of a gas discharger De for the edge part, and 4a an orifice hole made on the shower plate.

In addition, in FIG. 1, $EL_1 \cdot EL_2$ designate signal connection lines of a communication control circuit CT with pressure sensors $PS_1$ and $PS_2$, $EL_3$ a signal connection line of a communication control circuit with an electric switch valve SV, and $T_1$ a power source/signal input terminal.

Figure 5:
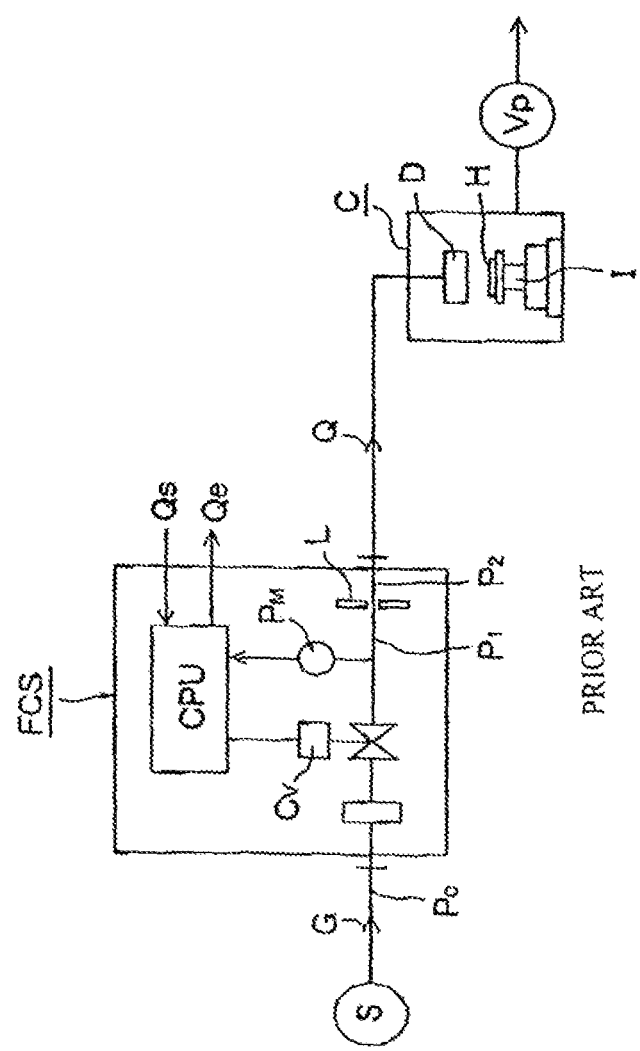
FIG. 5 is an explanatory drawing to show a method for supplying processing gas to a chamber by using a conventional pressure type flow controller FCS.
Figure 6:
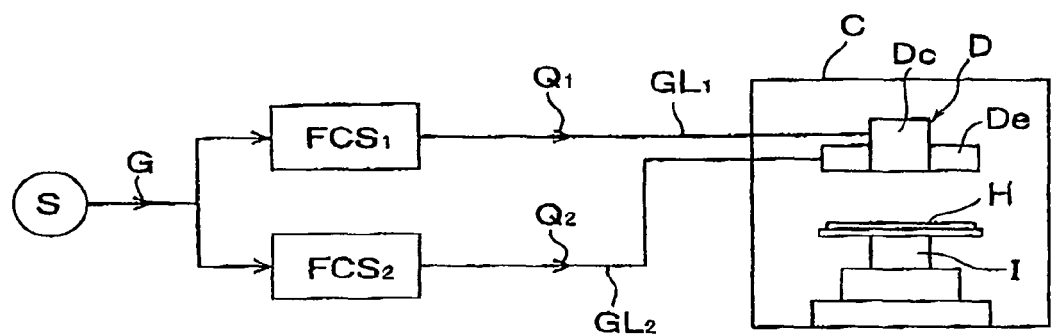
FIG. 6 is an explanatory drawing to show the case wherein processing gas is supplied to a chamber C from a single gas supply source S by using a plurality of pressure type flow controllers.
Figure 7:
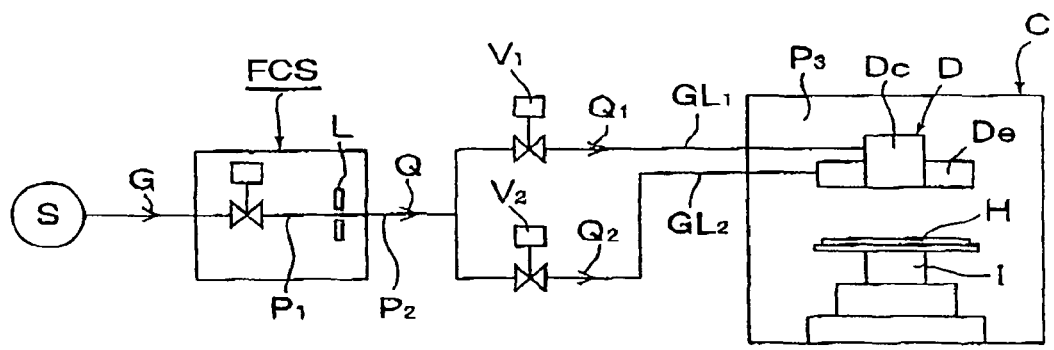
FIG. 7 is an explanatory drawing to show the case wherein processing gas is supplied to a chamber C from a gas supply source equipped with a pressure type flow controller by using control valves.

The afore-mentioned gas supply facility 1 comprises a processing gas supply source S, a plurality of flow controllers QCS and the like. Any type flow controllers QCS can be employed as a flow controller QCS as long as it functions accurately and quickly. A pressure type flow controller FCS illustrated in the afore-shown FIG. 5 has been used herewith for a flow controller QCS. When a specified flow rate setting signal Qs is inputted to a control unit (CPU), pressure $P_1$ on the upstream side of an orifice L is regulated by a control valve CV so that a flow rate Q on the downstream side is automatically adjusted to the set flow rate Qs.

Also, a control flow rate output signal Qe corresponding to the adjusted flow rate is outputted from the control unit (CPU). If it is found that the deviation between the flow rate setting input signal Qs and the afore-mentioned control flow rate setting signal Qe exceeds the prescribed time, an input/output deviation abnormality signal is transmitted from the CPU (not illustrated in FIG. 5) as stated later.

The afore-mentioned division quantity controller 2 comprises a plural number of open/close valves $OV_1$ and $OV_2$, a pressure type division quantity controller FV, a communication control circuit CT to control these, an electric switch valve SV for opening and closing of $OV_1$ and $OV_2$, orifice plates 3 and 4 connected to the ends of branch supply lines, and the like.

Figure 2:
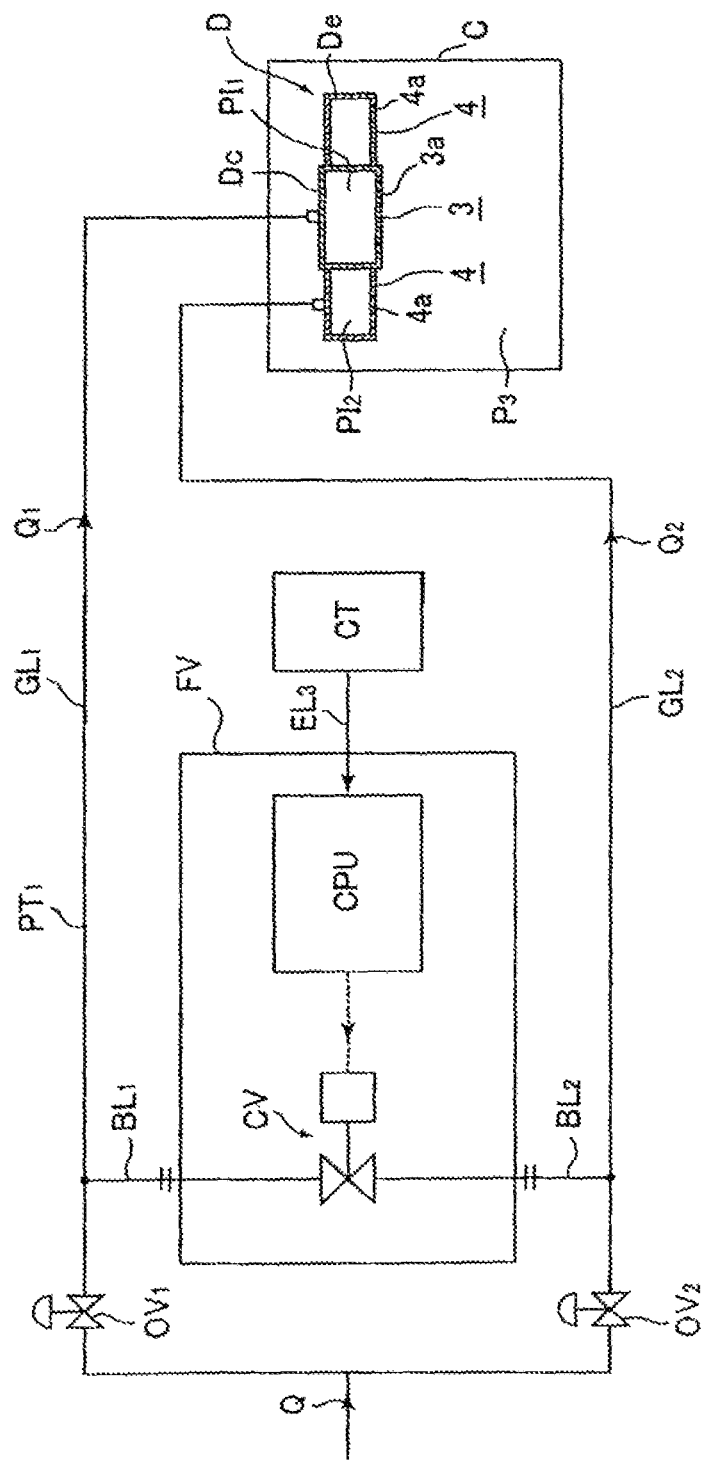
FIG. 2 is a basic block diagram of a pressure type division quantity controller FV.

As shown in FIG. 2, the afore-mentioned pressure type division quantity controller comprises a control valve CV, a driving control part (CPU) for the control valve CV and the like, to regulate the degree of opening of the control valve CV through the mediation of the driving unit part (CPU) with the control signal inputted CT through the line $EL_3$ from the communication circuit CT.

With the embodiment in FIG. 2, a piezo-driving stroke amplification type metal diaphragm valve is employed for a control valve CV of the afore-mentioned pressure type division quantity controller FV so that it is easily adaptable even when the flow rates $Q_1$ and $Q_2$ are large.

When processing gas G is supplied into a chamber C through orifice holes 3a and 4a made on shower plates 3 and 4 respectively, division quantities $Q_1$ and $Q_2$ can be controlled, as in the case of the orifice of a flow controller QCS, that is, a division quantity $Q_1$ is controlled with a formula $Q_1 = C_1 PI_1$ by adjusting $PI_1$ if the relationships $PI_1 > 2PI_3$ are maintained between pressure $P_3$ inside a chamber C and pressure $PI_1$ on the upstream side of the orifice hole 3a of the orifice plate 3 for the center part.

Similarly, a division quantity $Q_2$ is controlled with a formula $Q_2 = C_2 PI_2$ by $PI_2$ if the relationships $PI_2 > 2PI_3$ are maintained between pressure $P_3$ inside a chamber C and pressure $PI_2$ on the upstream side of the orifice hole 4a of the shower plate 4 for the edge part, (where $C_1$ and $C_2$ are constants dependent on the cross-sectional areas of the orifice holes 3a and 4a, their shapes or gas temperature).

Referring to FIG. 1, the afore-mentioned communication control circuit CT is provided with a power source/signal input terminal $T_1$, and connected to a pressure type division quantity controller FV and an electric switch valve through the mediation of signal connection lines $EL_3$ and $EL_4$.

An open/close valve OV is pneumatically operated. It is of a normal open type wherewith it is open under a state of driving air not being supplied, but both open/close valves $OV_1$ and $OV_2$ are normally being closed when a division quantity controller 2 is in a state of halting.

When a starting signal, a total flow quantity Q, a desire flow rate ratio $Q_2/Q_1$, a combination pattern of shower plates 3 and 4 and the like are inputted through the mediation of the power source/signal input terminal $T_1$, a communication control circuit CT makes the branch supply line with pressure set low out of set pressure $PI_1$ and $PI_2$ a subject-to-control branch supply line, while the remaining branch supply line a non-subject-to-control branch supply line as patterns of set pressure ratio $PI_2/PI_1$ shown in Table 1.

A communication control circuit CT opens an open/close valve of the non-subject-to-control branch supply line while it closes an open/close valve of the subject-to-control branch supply line.

Further, a communication control circuit CT determines values $Q_1$ and $Q_2$ with given total flow quantity Q and flow rate ratio.

TABLE 1

Set Pressure Ratio - Subject-to-control • Open/close valves operation command

| Set pressure | | Open/close valve operation command | |
|---|---|---|---|
| ratio $PI_2/PI_1$ | Subject-to-control | $OV_1$ | $OV_2$ |
| >1 | $PI_1$ | Close | Open |
| =1 | NONE | Open | Open |
| <1 | $PI_2$ | Open | Close |

By inputting a specified signal to the communication control circuit CT, pressure PT on the subject-to-control branch supply line side is regulated with the pressure type quantity controller FV.

Namely, a communication control circuit Ct starts comparing set values with actual pressure by the pressure signal measured and transmitted by a pressure sensor PS of the subject-to-control branch supply line, and a signal is transmitted to regulate the degree of opening of the division quantity controller FV so that the difference is reduced. Concretely, in the event that it is found with the comparison results that actual pressure is lower than set pressure, the degree of opening of the division quantity controller FV is made wider to raise pressure PT of the subject-to-control branch supply line. When the results of the comparison are found to be reverse, that is, actual pressure is higher than set pressure, the degree of opening of the division quantity controller FV is made narrower to lower pressure PT of the subject-to-control branch supply line.

Set pressure is determined beforehand by computation of the relationships of supply flow rates of shower plates with pressure.

The set pressure ratio is determined from the results of the computation based on the flow rate ratio $Q_2/Q_1$ supplied to branch supply lines $GL_1$ and $GL_2$ as shown in Table 2 and Table 3.

TABLE 2

[Set pressure ratio/Subject-to-control division quantity/Open/close valve operation command] to flow rate ratios
PATTERN 1

| Flow rate | Set pressure | Subject-to-control | Open/close valve operation command | |
|---|---|---|---|---|
| ratio $Q_2/Q_1$ | ratio $PI_2/PI_1$ | division flow quantity | $OV_1$ | $OV_2$ |
| 4/1 | 2.079 > 1 | $PI_1$ | Close | Open |
| 3/1 | 1.795 > 1 | $PI_1$ | Close | Open |
| 2/1 | 1.473 > 1 | $PI_1$ | Close | Open |

TABLE 2-continued

[Set pressure ratio/Subject-to-control division quantity/Open/close valve operation command] to flow rate ratios
PATTERN 1

| Flow rate | Set pressure | Subject-to-control | Open/close valve operation command | |
|---|---|---|---|---|
| ratio $Q_2/Q_1$ | ratio $PI_2/PI_1$ | division flow quantity | $OV_1$ | $OV_2$ |
| 1/1 | 1.041 > 1 | $PI_1$ | Close | Open |
| 1/2 | 0.736 < 1 | $PI_2$ | Open | Close |
| 1/3 | 0.601 < 1 | $PI_2$ | Open | Close |
| 1/4 | 0.520 < 1 | $PI_2$ | Open | Close |

TABLE 3

[Set pressure ratio/Subject-to-control division quantity/Open/close valve operation command] to flow rate ratios
PATTERN 2

| Flow rate | Set pressure | Subject-to-control | Open/close valve operation command | |
|---|---|---|---|---|
| ratio $Q_2/Q_1$ | ratio $PI_2/PI_1$ | division flow quantity | $OV_1$ | $OV_2$ |
| 4/1 | 2.008 > 1 | $PI_1$ | Close | Open |
| 3/1 | 1.795 > 1 | $PI_1$ | Close | Open |
| 2/1 | 1.473 > 1 | $PI_1$ | Close | Open |
| 1/1 | 1.041 > 1 | $PI_1$ | Close | Open |
| 1/2 | 0.736 < 1 | $PI_2$ | Open | Close |
| 1/3 | 0.601 < 1 | $PI_2$ | Open | Close |
| 1/4 | 0.520 < 1 | $PI_2$ | Open | Close |

With the present embodiment, for shower plates (orifice plates) 3 and 4 of gas dischargers Dc and De, two sets of shower plate, that is, $Dc_1$ having 420 orifice holes 3*a* and $Dc_2$ having 480 orifice holes 3*a* are ready for the afore-mentioned shower plate 3 for the center part, and similarly another two sets of shower plate, that is, $De_1$ having 360 orifice holes 4*a* and $De_2$ having 476 orifice holes 4*a* are also ready for the shower plate 4 for the edge part.

Furthermore, the afore-mentioned flow rate ratio $Q_2/Q_1$ can be set at 1/1, 1/2, 1/3, 1/4, 2/1, 3/1 or 4/1. Set pressure computed on this (or set pressure specified by the gas supply chamber side) and set pressure ratio are inputted to the input terminal T1.

As described later, set pressure and set pressure ratio listed in the above-shown Table 2 and Table 3 are determined by computing set pressure $PI_1$ and $PI_2$ on the upstream side of orifice holes 3*a* and 4*a* required to discharge the afore-mentioned specified flow quantities $Q_1$ and $Q_2$ of gas G judging with the bore sizes and numbers of orifice holes 3*a* and 4*a* of the shower plates 3 and 4 to be connected to the ends of branch gas supply lines. Further, it shows the ratio $PI_2/PI_1$ determined by computing with necessary set pressure $PI_2$ ad $PI_1$ on the upstream side obtained from the computation.

For combinations of the afore-mentioned shower plates 3 and 4, there are chosen beforehand a combination (hereinafter called Pattern !) of a shower plate 3 having 420 orifice holes 3*a* and a shower plate 4 having 360 orifice holes 4*a*, and combination (hereinafter called Pattern 2) of a shower plate 3 having 480 orifice holes 3*a* and a shower plate 4 having 476 orifice holes 4*a*.

The relationship of the afore-mentioned division flow rates $Q_1$ and $Q_2$ and pressure $PI_1$ and $PI_2$ are formulated by using the following equations of conductance.

That is, the flow rate Q of gas passing through a pipe is expressed by $Q = C \times (P_1 - P_2) \ldots (1)$ and $C = 182 \times D_4 \times (P_1 + P_2)/2 \times 1/L \ldots (2)$, where C represents a conductance (L/sec), D the diameter of a pipe (cm), L the length of a pipe (cm), $P_1$ upstream pressure of a pipe (Torr), $P_2$ downstream pressure of a pipe (Torr) and Q a flow rate (Torr·L/sec).

With the above equations (1) and (2), internal pressure ($PI_1$ and $PI_2$) on the upstream side of a shower plate is computed by using the outer diameter of the orifice hole of the shower plate as D, the length of the orifice hole of the shower plate as L, the internal pressure of a chamber ($P_3$=0.015 Torr) as downstream side pressure $P_2$, and a flow rate per a orifice hole as a flow rate Q respectively.

Figure 3:
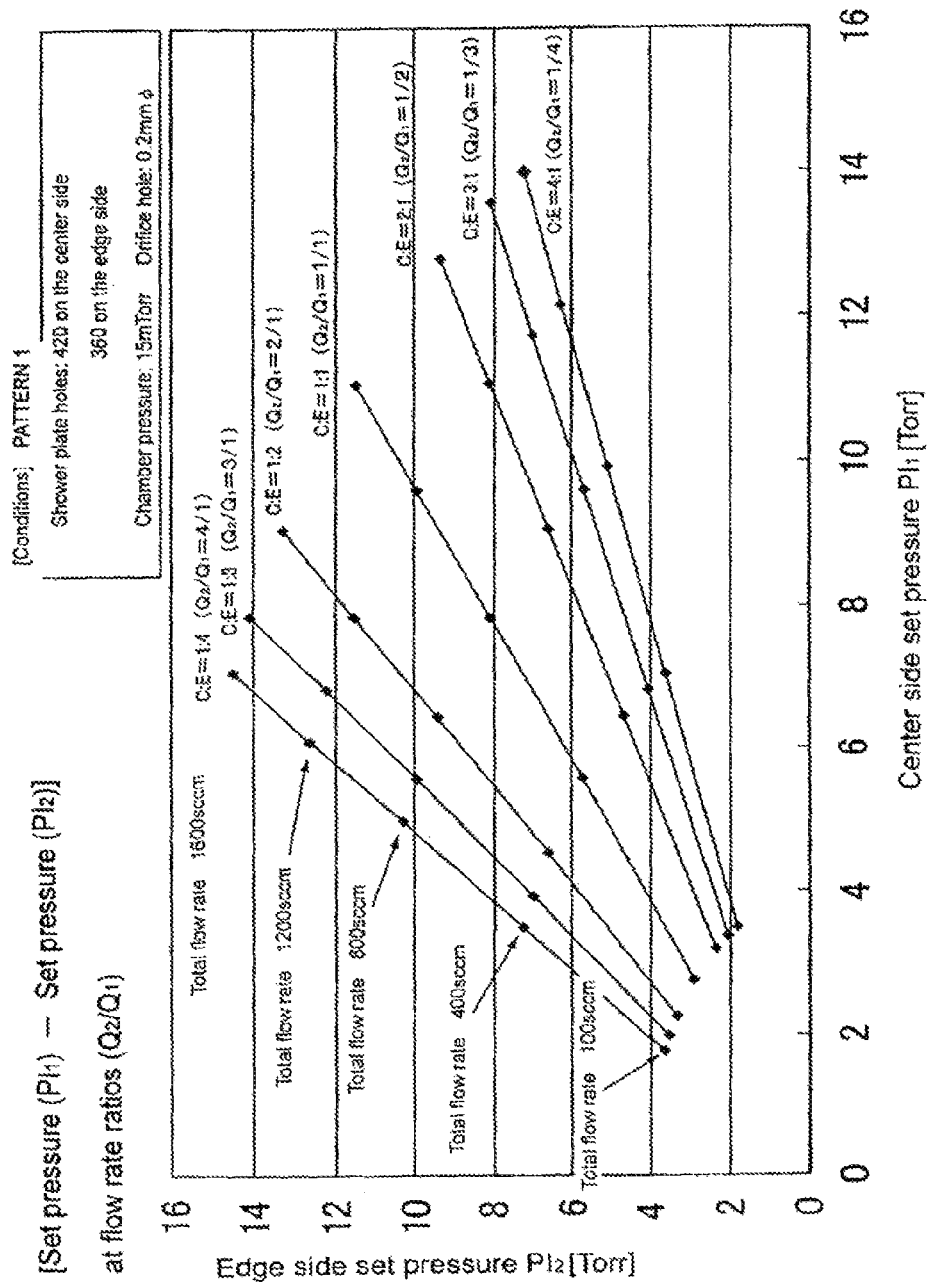
FIG. 3 is lines (computed values) to illustrate the relations between set pressure ($PI_1$ and $PI_2$) and a division flow rate ratio $Q_2/Q_1$ in the event that shower plated 3 and 4 to be used are made to be a Patter 1 with supply while dividing in FIG. 1.

FIG. 3 is numerical values shown as a graph illustrating the relationships, in the event (Pattern 1) that a shower plate 3 of the gas discharger Dc for the center part having 420 orifice holes with an internal diameter of 0.2 mm ϕ and a shower plate 4 of the gas discharger De for the edge part having 360 orifice holes with an internal diameter of 0.2 mm ϕ are combined, of a total flow rate (a whole flow rate) Q, control pressure $PT_1$ for the center part and control pressure $PT_2$ for the edge part are computed making a flow rate ratio (E/C=$Q_2$/$Q_1$) as a parameter. For example, in case of Q=1600, 1200, 800, 400 and 100 SCCM at $Q_2/Q_1$=1, the mean value of the ratio $PI_{12}/PI_1$ of control pressure $PI_2$ on the edge part side and control pressure $PI_1$ on the center part side becomes 1.041.

Figure 4:
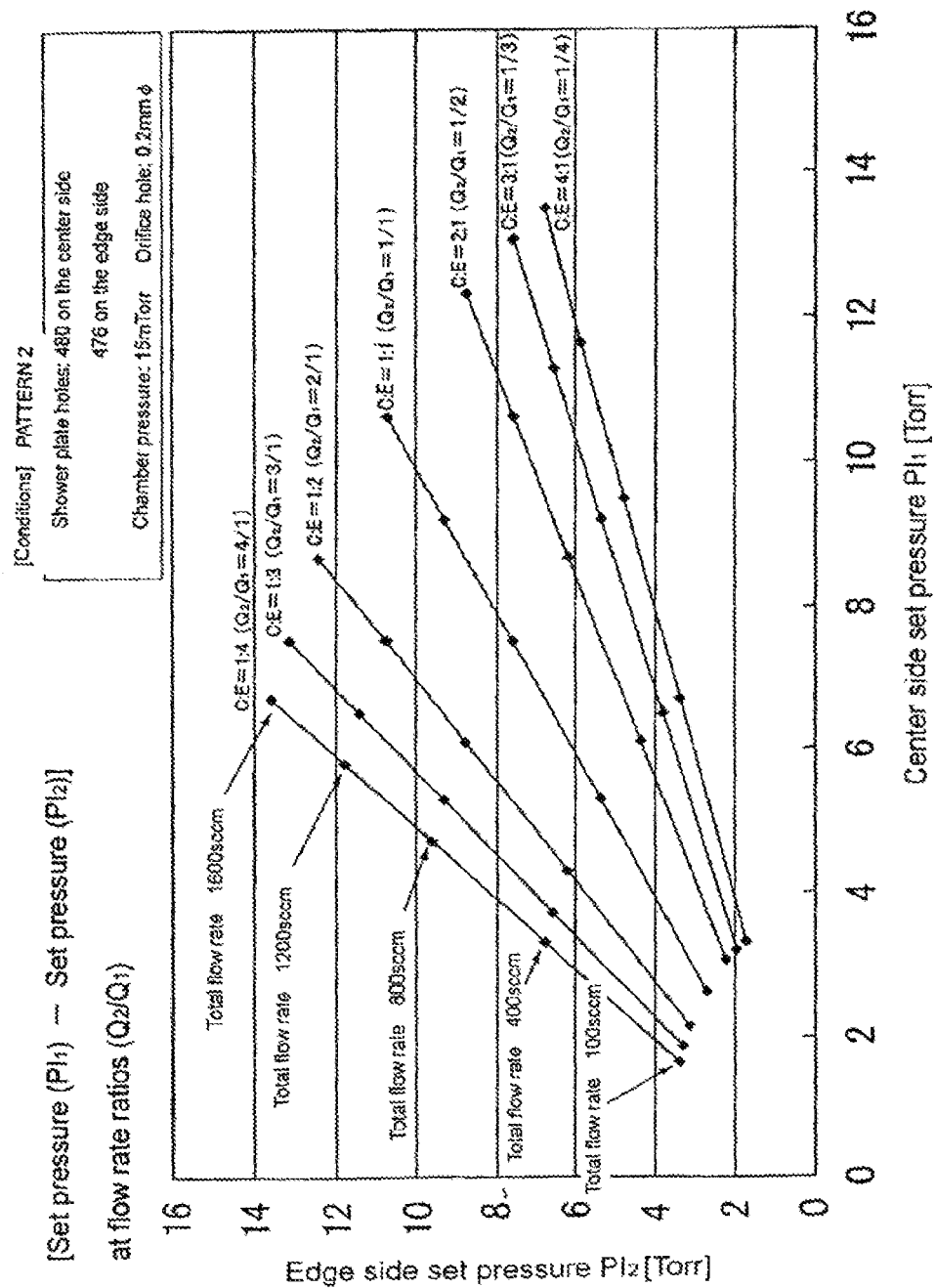
FIG. 4 is lines (computed values) to illustrate the same relations in the event that shower plates 3 and 4 to be used are made to be a Pattern 2 as with FIG. 3.

Similarly, FIG. 4 is numerical values shown as a graph in the event (Pattern 2) that a shower plate 3 for a gas discharger Dc for the center part having 480 orifice holes with an internal diameter of 0.2 mm ϕ and a shower plate 4 for a gas discharger De for the edge part having 476 orifice holes with an internal diameter are combined. For example, in case of Q=1600, 1200, 800, 400 and 100 SCCM at $Q_2/Q_1$, the mean value of the ratio $PI_2/PI_1$ of control pressure $PI_2$ on the edge part side and control pressure $PI_1$ on the center part side becomes 1.001.

Table 2 and Table 3 illustrate all computed values that show the relationships of the flow rate ratio $Q_2/Q_1$ and the ratio $PI_2/PI_1$ of control pressure $PI_2$ on the edge part side and control pressure $PI_1$ on the center part side with Patter 1 and Pattern 2 shown in FIG. 3 and FIG. 4. For example, FIG. 3 shows that the ratio $PI_2/PI_1$ of control pressure $PI_2$ on the edge part side and control pressure $PI_1$ on the center part side becomes mathematically 1.041 in case that combination of shower plates 3 and 4 to be used is made to be Pattern 1, and that the flow rate ratio $Q_2/Q_1$ is 1.

A method for supplying gas while dividing to a chamber according to the present invention is explained hereafter. Referring to FIG. 1 and FIG. 2, both open/close valves $OV_1$ and $OV_2$ are fully closed in case that a starting signal is not inputted to a communication control circuit CT.

To supply a total quantity Q of gas while dividing at a specified ratio $Q_2/Q_1$ (for example, $Q_2/Q_1$=1/2), a total flow quantity Q, a combination pattern of shower plates 3 and 4 of gas dischargers Dc and De connected to the ends of branch supply lines $GL_1$ and $GL_2$, and a desired flow rate ratio $Q_2/Q_1$ are inputted to a communication control circuit CT. A control pressure ratio $PI_2/PI_1$ corresponding to shower plates 3 and 4 and a flow rate ratio $Q_2/Q_1$ is inputted as a set signal.

Next, a subject-to-control flow while dividing and a non-subject-to-control flow while dividing are determined by a communication control circuit CT based on given total quantity Q, a flow rate ratio $Q_2/Q_1$ and set pressure $PI_1$ and $PI_2$. Then an open/close valve OV of a non-subject-to-control branch supply line is opened, while an open/close valve OV of a non-subject-to-control branch supply line is closed.

For example, upon receiving a signal indicating t total flow rate Q of 1200 SCCM, Pattern 1 of combination patterns of shower plate 3 and 4, a branch flow ratio $Q_2/Q_1$=1/2, set pressure $PI_1$ and set pressure $PI_2$, a communication control circuit CT determines a branch supply line $GL_1$ corresponding to $PI_1$ which set pressure is set lower out of set pressure $PI_1$ and $PI_2$ to be a subject-to-control branch supply line, while a remaining branch supply line $GL_2$ to be a non-subject-to-control branch supply line.

Am open/close valve $OV_2$ of the non-subject-to-control branch supply line $GL_2$ is opened, while an open/close valve $OV_1$ of the subject-to-control branch supply line $GL_1$ is closed by the communication control circuit CT.

The communication control circuit CT compares set pressure $PI_1$ with actual pressure $PT_1$ by the pressure signal measured and transmitted by the pressure sensor $PS_1$ of the subject-to-control branch supply line $GL_1$.

The communication control circuit CT compares set pressure $PI_1$ of a subject-to-control branch supply line $GL_1$ with actual pressure $PT_1$, to transmit a signal to regulate the degree of opening of a division quantity controller FV to reduce the difference.

Namely, in the event that comparison results found that actual pressure $PT_1$ is lower than set pressure $PI_1$ the degree of opening of the division quantity controller FV is made wider to raise pressure of the subject-to-control branch supply line $PL_1$. With the reverse results that actual pressure $PT_1$ is higher than set pressure $PI_1$, the degree of opening of the division quantity controller FV is made narrower to lower pressure of the subject-to-control branch supply line $PL_1$.

With the communication control circuit CT, set pressure $PI_1$ of the subject-to-control branch supply line $GL_1$ and actual pressure are compared. When there is found no difference, or the difference is converged on the range of difference set in advance, the degree of opening of the division quantity controller FV is maintained, thus an automatic flow division control being completed.

Namely, a specified quantity Q of raw gas G from a gas supply source S is supplied to a wafer H into a chamber C through gas dischargers Dc and De while dividing at a specified floe rate ratio $Q_1/Q_2$.

Also, with the communication control circuit CT, set pressure $PI_1$ and actual pressure $PT_1$ are compared. When there is found no difference, or the difference is converged on the range of difference set in advance, the degree of opening of the division quantity controller FV is maintained, thus an automatic flow division control being completed. However, in the event that actual pressure $PT_1$ fluctuates due to temperature changes or any other reasons, and the difference with set pressure $PI_1$ comes to exceed the difference set in advance, a communication control circuit restarts to regulate the degree of opening of the division quantity controller FV.

With the embodiment, it is so constituted that a starting signal, a total flow quantity Q, a desired flow rate ratio $Q_2/Q_1$, combination patterns of shower plates 3 and 4, set pressure $PI_1$ and $PI_2$ and the like are inputted to a communication control circuit CT through a power source/signal input terminal. However, it can be so constituted that a communication control circuit CT determines a subject-to-control branch supply line and it set pressure from the signals of the aforementioned total flow quantity Q, a flow rate ratio $Q_2/Q_1$ and the like and the data computed in advance.

Feasibility of Industrial Use

The present invention can be applied to facilities wherewith fluids are supplied while dividing under critical pressure conditions. For example, it can be utilized with a chamber in semiconductor manufacturing facilities or with a camber in facilities for manufacturing chemical or pharmaceutical products.

The invention claimed is:

1. A method for supplying gas while dividing to a chamber from a gas supply facility equipped with a flow controller, the method comprising the steps of:

supplying a specified quantity Q of gas, while dividing at a specified flow rate ratio Ql/Q2 from a gas supply facility provided with a flow controller, into a chamber through a plurality of branch supply lines including a first branch supply line and a second branch supply line and shower plates are fixed to ends thereof, wherein a first open/close valve and a second open/close valve are installed on the first branch supply line and on the second branch supply line, respectively, a first bypass line is disposed on a downstream side of the first open/close valve and is branched from the first branch supply line and a second bypass line is disposed on a downstream side of the second open/close valve and is branched from the second branch supply line, a pressure type division quantity controller is connected to the first bypass line and to the second bypass line, a first pressure sensor is disposed to measure pressure inside the first branch supply line and a second pressure sensor is disposed to measure pressure inside the second branch supply line GL2 so that a total quantity Q=Q1+Q2 of gas is supplied, while dividing, into a chamber at desired division quantities Q1 and Q2 by opening the open/close valve of whichever one of the first branch supply line and the second branch supply line has a larger flow rate to regulate a degree of opening of the pressure type division quantity controller FV; and adjusting flow rate of the one branch supply line that has the larger flow rate to the flow rate of the other branch supply line that has the smaller flow rate, thus regulating pressure in the first branch supply line and the second branch supply line, wherein Q1 and Q2 are specified quantities of gas supplied to the first branch supply line and the second branch supply line, respectively.

2. A method for supplying gas while dividing to a chamber from a gas supply facility equipped with a flow controller as claimed in claim 1, wherein the degree of opening of the pressure type division quantity controller is regulated to reduce a difference between actual pressure of a branch supply line and set pressure to reach the specified flow rate ratio Q1/Q2 by comparing either one of a first set pressure or a second set pressure, respectively, of the first branch supply line and the second branch supply line to reach the specified flow rate ratio Q1/Q2 with corresponding first actual pressure or second actual pressure of the first branch supply line and the second branch supply line measured by the first pressure sensor or the second pressure sensor.

3. A method for supplying gas while dividing to a chamber from a gas supply facility equipped with a flow controller as claimed in claim 2, wherein the first open/close valve and the second open/close valve are pneumatically operated, and a switch valve is disposed to supply actuating air to the first open/close valve and the second open/close valve so that the open/close valve of the one branch supply line with the larger supply quantity is opened by the switch valve.

4. A method for supplying gas while dividing to a chamber from a gas supply facility equipped a flow controller as claimed in claim 2, wherein a pressure type flow controller is used for the flow controller.

5. A method for supplying gas while dividing to a chamber from a gas supply facility equipped with a flow controller as claimed in claim 1, wherein the first open/close valve and the second open/close valve are pneumatically operated, and a switch valve is disposed to supply actuating air to the first open/close valve and the second open/close valve so that the open/close valve of the one branch supply line with the larger supply quantity is opened by the switch valve.

6. A method for supplying gas while dividing to a chamber from a gas supply facility equipped a flow controller as claimed in claim 5, wherein a pressure type flow controller is used for the flow controller.

7. A method for supplying gas while dividing to a chamber from a gas supply facility equipped a flow controller as claimed in claim 1, wherein a pressure type flow controller is used for the flow controller.

* * * * *